March 16, 1937.    E. M. FRASER    2,073,926
ELECTROMAGNETIC BRAKE
Filed April 16, 1934    5 Sheets-Sheet 1
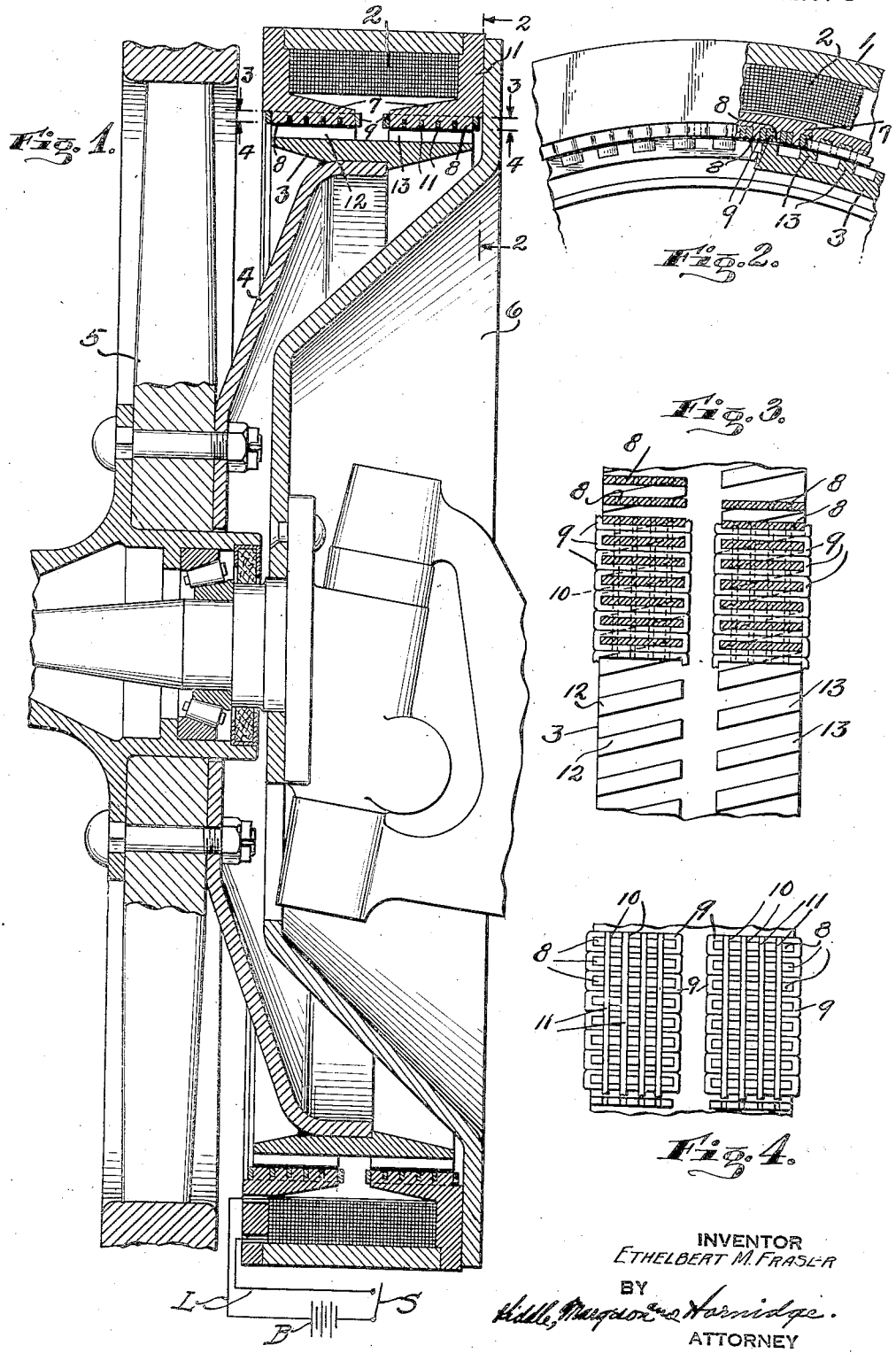
INVENTOR
ETHELBERT M. FRASER
BY
ATTORNEY March 16, 1937.  E. M. FRASER  2,073,926
ELECTROMAGNETIC BRAKE
Filed April 16, 1934  5 Sheets-Sheet 2
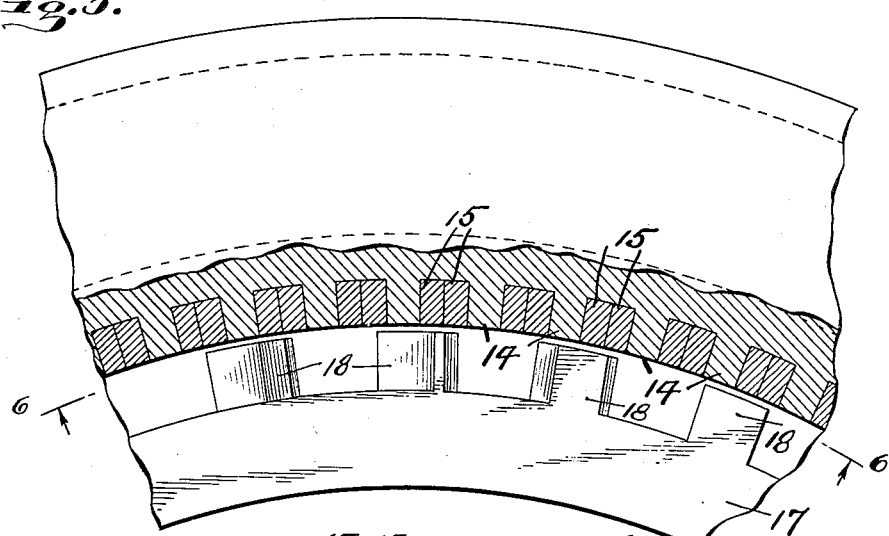
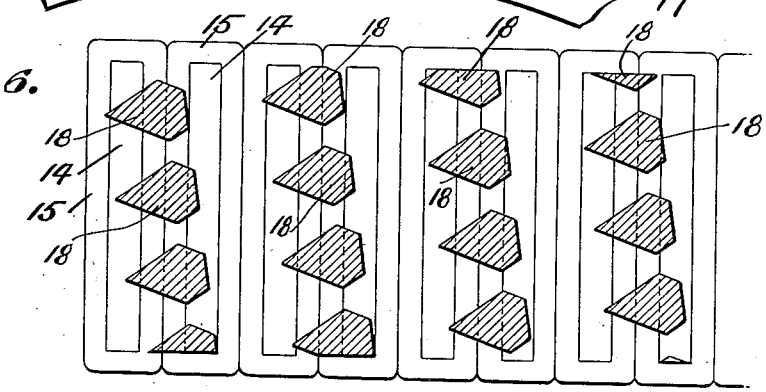
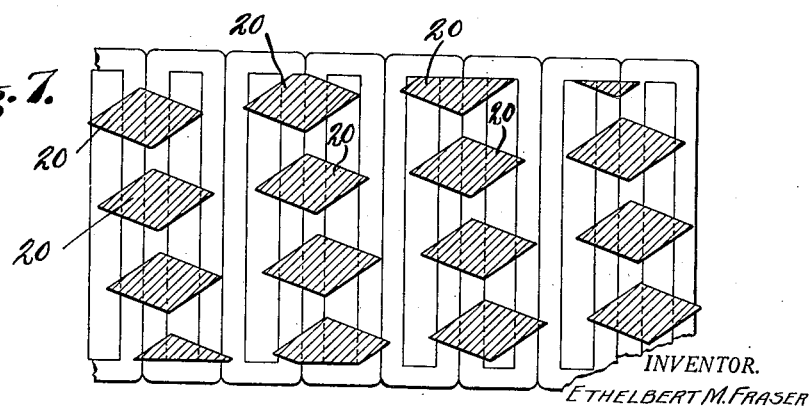
INVENTOR.
ETHELBERT M. FRASER
BY
Kiddle, Margeson and Harridge.
ATTORNEYS.

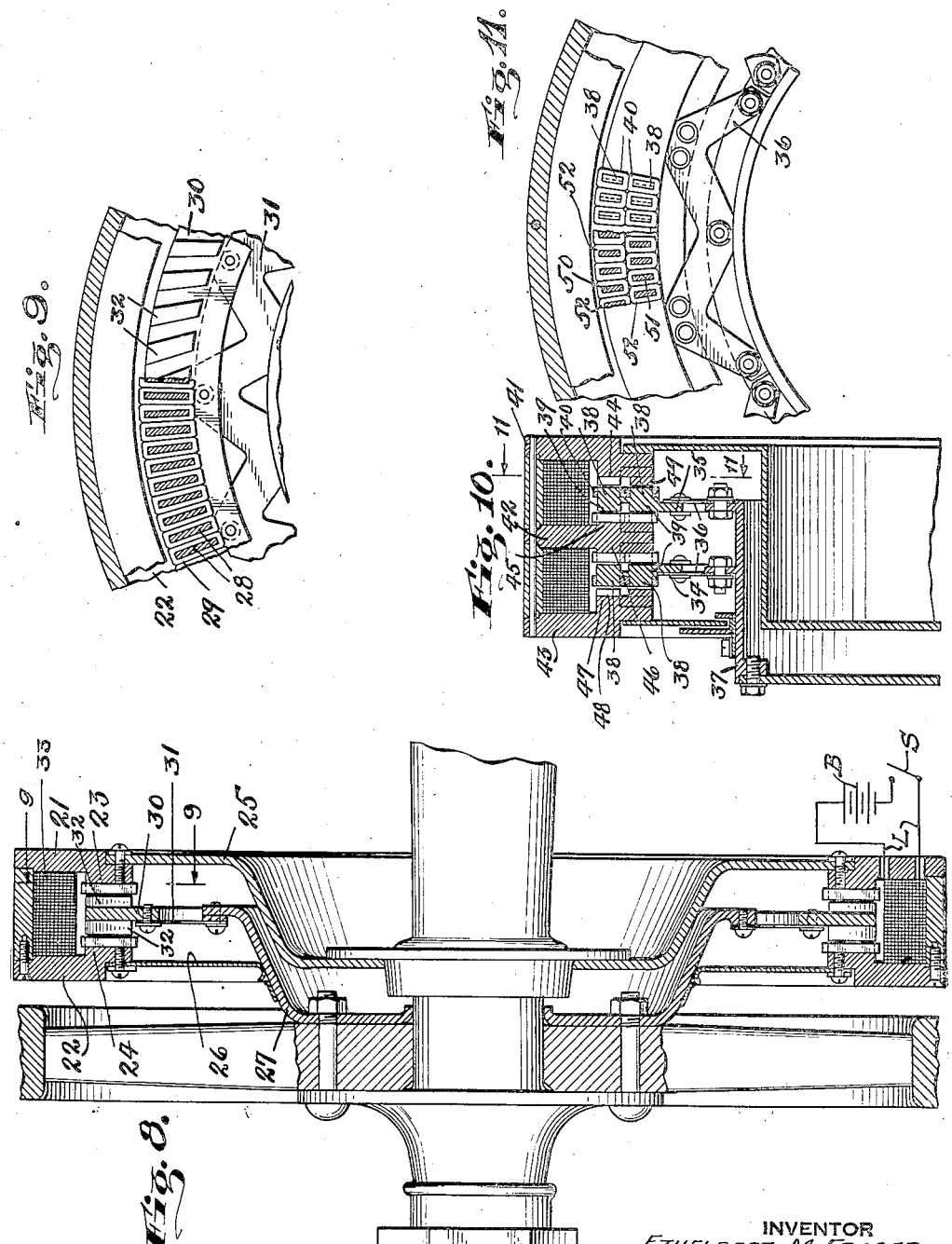

March 16, 1937.  E. M. FRASER  2,073,926
ELECTROMAGNETIC BRAKE
Filed April 16, 1934  5 Sheets-Sheet 4
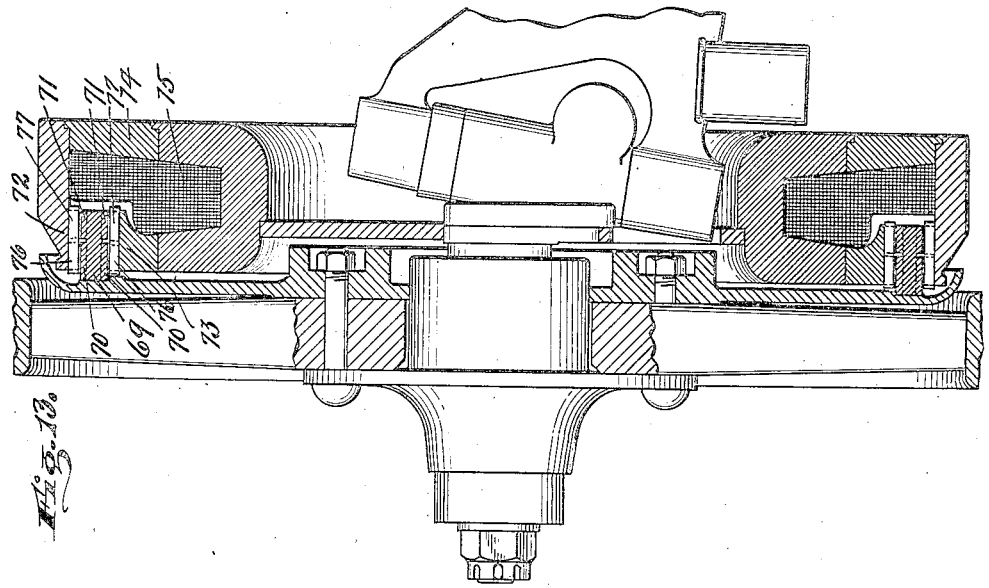
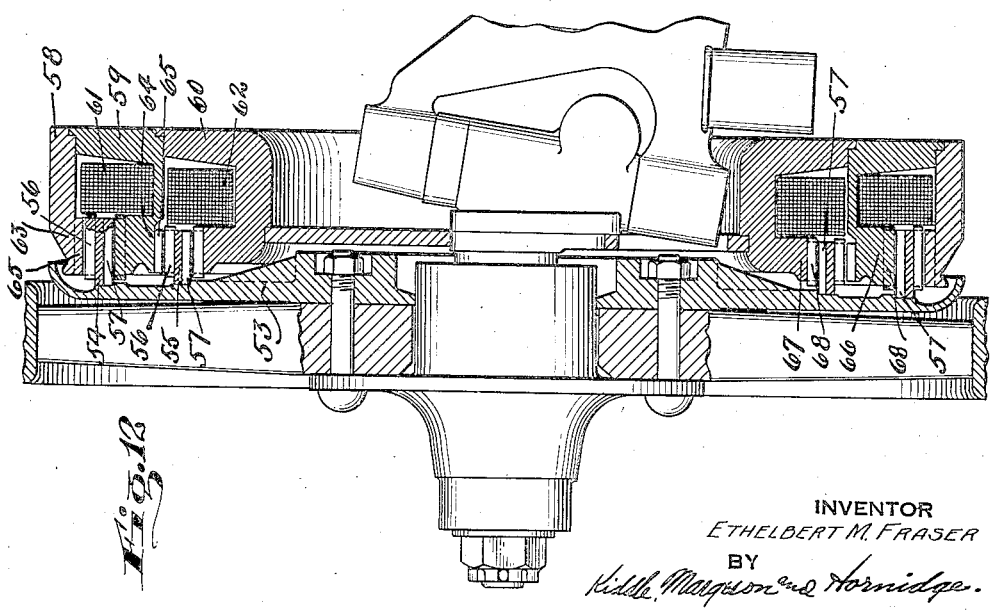
INVENTOR
ETHELBERT M. FRASER
BY
Kiddle, Margeson and Hornidge
ATTORNEYS.

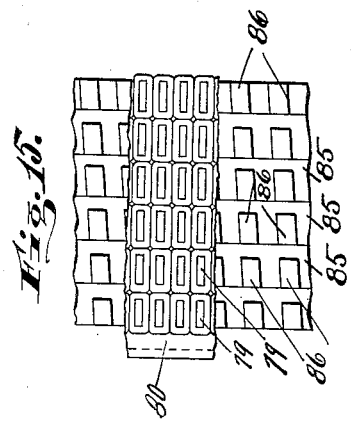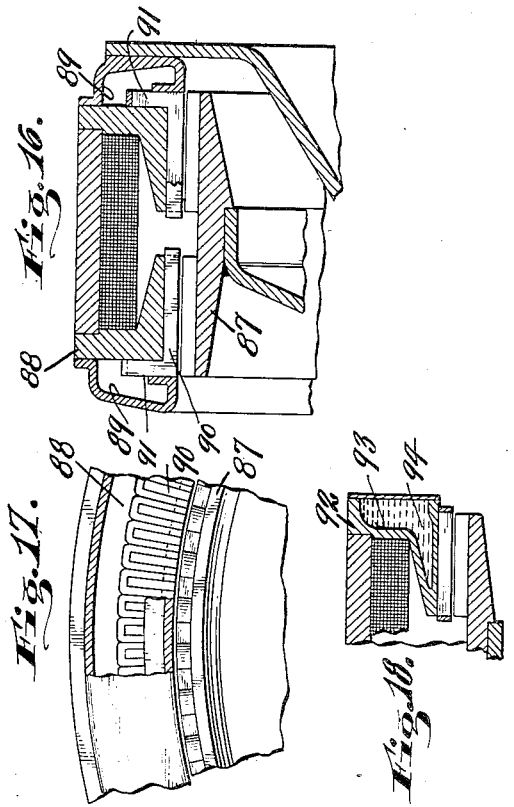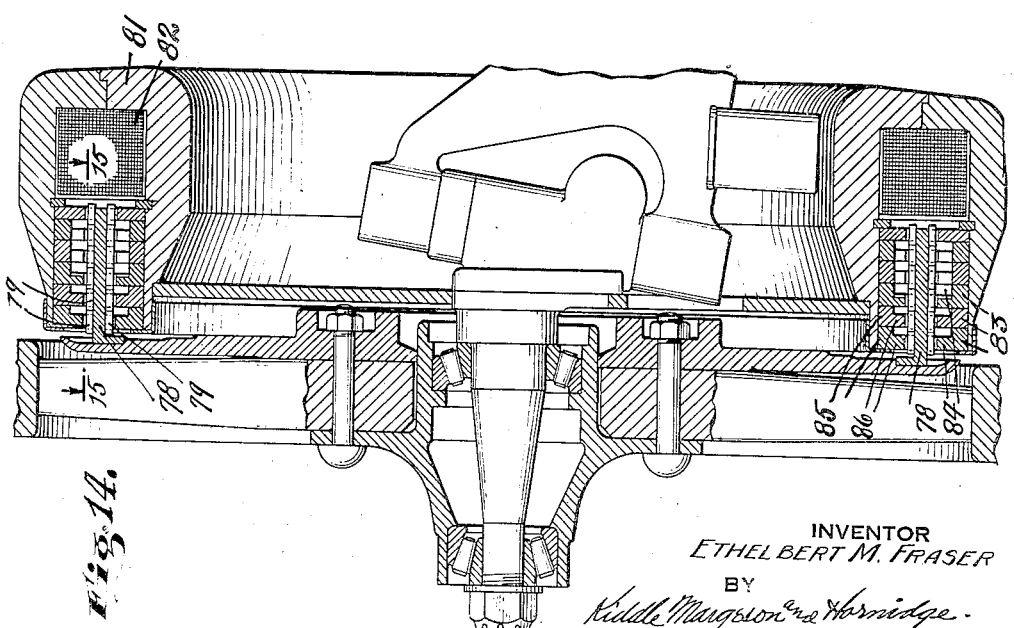

Patented Mar. 16, 1937

2,073,926

UNITED STATES PATENT OFFICE 2,073,926

ELECTROMAGNETIC BRAKE

Ethelbert M. Fraser, Yonkers, N. Y., assignor to Fraser Automotive Appliances, Inc.

Application April 16, 1934, Serial No. 720,717

39 Claims. (Cl. 188—104)

The present invention is directed to an improvement in electromagnetic brakes.

Without attempting to exhaust all of the characteristics of my improved brake, and its advantages over prior designs, as well as all of the objects of the present invention, the following may be noted:

One.—The brake of the present invention essentially comprises two elements, a stator and a rotor, these two members being maintained out of contact with each other whereby all friction with its consequent wear is eliminated and my improved construction being such that the reluctance of the main magnetic circuit remains constant.

Two.—My improved electromagnetic brake is so designed as to provide a brake which will be of minimum weight without the sacrifice of brake action, thereby providing a structure which is commercially adaptable for commercial vehicles as at present designed in substitution for the mechanical and hydraulic brakes now universally used in the automotive industry, for example.

Three.—My improved brake, furthermore, is designed so as to be quiet in operation thereby adapting the same for ordinary commercial use.

Four.—The electromagnetic brake of this invention comprises essentially a rotor and a stator each provided with polar projections or teeth so relatively disposed that retardation and holding are effected by zones of dense flux passing from the teeth of the rotor to the teeth of the stator, and inasmuch as the retarding and holding actions vary as the square of the flux density, the present invention provides for maximum flux density at the heel or trailing portion of each rotor tooth and at the toe or leading portion of each of the cooperating stator teeth.

Five.—In addition to a stator and a rotor my improved brake essentially comprises an exciting coil or coils, the stator and rotor teeth preferably being inside of or surrounded by this exciting coil whereby the flux density is increased thereby increasing the efficiency of my improved apparatus as a braking mechanism.

Six.—While good brake action is obtained in an electromagnetic brake structure such as constituting the subject matter of my Patent No. 1,954,809, granted April 17, 1932, wherein I provide a structure in which the stator and rotor teeth are parallel I find greatly improved results are obtained by the present construction wherein the teeth are angularly disposed with respect to each other.

Other and further objects will appear hereinafter.

In the accompanying drawings:

Fig. 1 is a sectional elevational view of one embodiment of my invention;

Fig. 2 is a section on the line 2—2 of Fig. 1;

Fig. 3 is a developed view taken at the line 3—3 of Fig. 1;

Fig. 4 is a similar view taken at the line 4—4 of Fig. 1;

Fig. 5 is a fragmentary sectional view of a modified embodiment of my invention;

Fig. 6 is a developed view taken substantially on the line 6—6 of Fig. 5;

Fig. 7 is a developed view similar to that of Fig. 6 showing a modified tooth arrangement;

Fig. 8 is a sectional elevational view similar to Fig. 1 of a further modification of the invention;

Fig. 9 is a section on the line 9—9 of Fig. 8;

Fig. 10 is a fragmentary view in sectional elevation of a further modification of the invention;

Fig. 11 is a section on the line 11—11 of Fig. 10;

Figs. 12, 13 and 14 are sectional elevational views similar to Fig. 1 of further embodiments of my invention;

Fig. 15 is a developed view taken substantially at the line 15—15 of Fig. 14;

Fig. 16 is a fragmentary sectional elevational view of another embodiment of my invention in which provision is made for cooling and sound deadening;

Fig. 17 is a view substantially on the line 17—17 of Fig. 16; and

Fig. 18 is a fragmentary view showing another construction also embodying cooling and sound deadening means.

Referring to the drawings in detail and first of all to the embodiment of my invention illustrated in Figs. 1, 2, 3 and 4, my improved electromagnetic brake essentially comprises a rotor, a stator and an exciting coil or coils. Upon reference to the several figures just mentioned it will be seen that this embodiment of my invention is in the nature of a circular electromagnet comprising a fixed sectional ring electromagnet frame 1, carrying an exciting coil 2 receiving its energy from any suitable source of power, the ring armature 3 for the electromagnet being rotatable.

When my brake is applied to a motor vehicle for example the armature or rotor 3 conveniently may be attached to the bell 4 attached to the wheel 5, while the stator or magnet frame 1 may be attached to a stationary drum or housing 6. In such an installation the energizing current for the coil 2 may be taken from the vehicle battery.

The sides of the electromagnet frame 1 are so shaped that the poles 7 extend inwardly towards each other parallel to the axis of rotation of the rotor. This construction provides an annulus or ring and on the inner face of this ring or annulus, i. e. on the face of the poles 7 I provide teeth 8 or polar projections extending parallel to the axis of rotation of the rotatable element of the device, each of these teeth being surrounded by a closed copper loop or short-circuiting electroconductive means 9. If desired the face of the teeth 8 may be slotted transversely as shown at 10 and the slots filled with copper, for example, brazed in place and designated 11. This provides a construction by which the teeth 8 are divided into a number of sections each surrounded by a copper circuit, which is desirable when the angle between the teeth 12 and 8 is very large.

The rotor or armature 3 is in the form of a ring or annulus concentric with the stator, the periphery of this armature lying close to the poles 7 of the stator. The outer periphery of the armature is provided with two series of teeth or polar projections 12 and 13, these teeth instead of extending parallel to the teeth 8 on the magnet poles, extending at an angle thereto. While the teeth both on the rotor and stator are evenly spaced, the number of teeth on one of these elements is a multiple of the number of teeth on the other. As illustrated I have provided twice as many teeth on one element (the stator as illustrated) as on the other element, as I have found such an arrangement gives excellent results. It will be seen from the drawings that the teeth 8 on the face of the pole 7 are smaller than the teeth or polar projections 12 and 13 on the rotor or armature 3 and hence throughout the remainder of this description and in the claims these teeth will be referred to, respectively, as minor extent teeth and major extent teeth. It is to be noted also that the width of each of the major width teeth 12 and 13 circumferentially is substantially equal to the circumferential width of one of the minor width teeth 8 plus the circumferential width of the space between adjacent teeth 8.

In my copending application above referred to the number of teeth on one element of the brake was a multiple of the number of teeth on the other brake element, but in that design the teeth in one element extended parallel to the teeth of the other element. The present invention retains the novel feature of the teeth of one element being a multiple of the number of teeth of the other element, but I find that improved results are obtained if, as in the present invention, I arrange the teeth of one element at an angle to the teeth on the other element.

It will be appreciated, of course, that retardation and holding, i. e. resistance to movement of the rotor of my brake with respect to the stator are effected, when the coil 2 is energized, by zones of dense flux passing from the teeth of one element to the teeth of the other. Inasmuch as retarding and holding vary as the square of the flux density, it is of very material advantage to have as great a flux density as possible at the heel or trailing portion of the rotating tooth and at the toe or leading portion of the stationary tooth.

I have found also that by disposing the teeth of one element at an angle to the teeth of the other element the holding and retarding pull between the teeth is spread over a wider angle of rotation than in the case of parallel teeth, so that retardation is more uniform and noise reduced, all of which makes for a more satisfactory commercial brake.

It will be appreciated also from the foregoing that the brake of this invention is superior to the design in my copending application above referred to in that the rotor and stator teeth are disposed inside the exciting coil 2, i. e. are surrounded by the exciting coil, as distinguished from my prior invention above mentioned, the lines of force by the present arrangement being caused by the magneto-motive force to travel in parallel paths thereby to increase the flux density, and improve the braking action.

It will be further appreciated that the teeth of the stator and rotor are so arranged that the reluctance of the main magnetic circuit of the device remains substantially constant at all positions of relative movement between the stator and rotor, due to the fact that at all positions of the rotor relatively to the stator the total area of the minor extent teeth covered by the major extent teeth is the same.

It will be still further appreciated that the major extent polar projections 12 and 13 are so proportioned that a given one thereof provides a magnetic bridge between two of the minor extent polar projections 8 of such span as to contract the flux path between itself and one of said minor extent polar projections at the same time and to substantially the same degree that it expands the flux path between itself and the other of said minor extent polar projections.

With reference to the embodiment of my invention as illustrated in Figs. 5 and 6: In this construction the poles of the electromagnet are provided with minor extent teeth 14 each surrounded by a closed copper loop or winding or short-circuiting electroconductive means 15 as in the embodiment shown in Fig. 1, the teeth extending parallel to the axis of rotation of the rotor.

The other element 17 of the brake, the rotor as illustrated, is provided on its periphery with teeth 18 of major extent cooperating with the minor extent teeth 14, these teeth being arranged spirally circumferentially of the element 17, and being offset with respect to each other transversely of the face of the element 17, so that each group of teeth disposed transversely of the element 17 lies at an angle to the teeth 14, similar to the angular disposition of the teeth 12 and 13 of Fig. 3 with respect to the teeth 8.

It will be seen that each of the teeth 18 is roughly triangular in cross section (see Fig. 6) the apex of each triangle provided by each tooth concentrating the flux and insuring maximum retarding and holding.

The arrangement shown in Figs. 5 and 6 is quieter running on movement of the teeth 18 from right to left as viewed in Fig. 6 with respect to the stator, than the arrangement of Fig. 1 for example, and retarding and holding improved for both directions of movement. It is to be understood that the energizing coil surrounds the teeth of both the magnet and armature as in Fig. 1.

In Fig. 7 the stator is constructed the same as in Fig. 5, while the rotor is provided with teeth 20 arranged the same as in Figs. 5 and 6, the teeth 20, however, being diamond-shaped in cross section. This construction gives me all the advantages of the construction described in connection with Figs. 5 and 6, with the additional advantage that the retarding and holding action are the same for both directions of travel of the rotor.

It will be seen that in the teeth of Fig. 6 as well as in the teeth of Fig. 7 the adjacent sides meet each other at an angle other than a right angle.

In the embodiment of my invention as illustrated in Figs. 8 and 9 I provide a circular electromagnet the stationary frame of which is divided into two sections 21 and 22, the poles 23 and 24 extending inwardly toward each other, the faces of the poles extending radially of the device. The frame section 21 is shown bolted to fixed housing 25, while a thin plate 26 is bolted to the frame section 22, the inner edge of this plate, which is in the form of an annulus, resting upon the periphery of the housing 27 which carries the rotor as will be explained presently.

The opposing faces of the poles 23 and 24 are provided with minor extent teeth 28, extending radially of the device, each tooth being surrounded with a closed copper loop 29 providing a closed circuit of low resistance.

The rotor 30 is in the form of a ring or annulus secured to a thin flexible plate 31 carried by the rotary housing 27, the rotor as will be understood lying intermediate the poles 23 and 24 of the stator. In this embodiment of my invention the opposite faces of the rotor are provided with major extent teeth 32 cooperating with the minor extent teeth 28 on the faces of the stator poles.

As will be seen from Fig. 9 the teeth 32 of major extent are disposed at an angle to the minor extent teeth 28 on the stator. By mounting the rotor on the thin plate 31 a certain amount of misalignment or displacement of the rotary and stationary parts, to which the rotor and stator of the brake are applied, is permitted without causing the teeth on the rotor to rub on the teeth of the poles of the stator with excessive pressure.

The exciting coil 33 in this embodiment of my invention surrounds the teeth of both the stator and rotor as in the other embodiments of my invention already described.

In the embodiment of my invention illustrated in Figs. 10 and 11, two armatures 34 and 35 each in the form of a ring or annulus are mounted on thin metal plates 36 secured to rotary housing 37.

The outer face of each of the armatures 34 and 35 is provided with two sets of teeth 38 and the inner face of each armature with two sets of teeth 39, extending radially with respect to the axis of rotation of the rotor. Each tooth 38 is surrounded by a closed copper coil or short-circuiting electroconductive means 40. The teeth 39 are not so surrounded.

The stator of this embodiment of my invention comprises an annular magnet frame composed of sections 41, 42 and 43 providing poles 44, 45 and 46, 47. The faces of each of the poles 44 and 47 are provided with two sets of teeth 48 and 49 in staggered relation, while the faces of the poles 45 and 46 are provided with two sets of teeth 50 and 51 arranged in staggered relation, each of the teeth composing the sets 50 and 51 being surrounded by closed copper coils or electroconductive means 52.

In the embodiment of my invention illustrated in Fig. 12 rotary member 53 carries on its face two ring armatures 54 and 55 each of which is provided with copper clad teeth 56 on both faces, i. e. on its outer periphery, extending parallel to the axis of rotation of the armatures, and on its inner periphery with non-clad teeth 57 also extending parallel to the axis of rotation.

The stator is composed of three sections 58, 59 and 60 providing two electromagnet frames. The energizing coils are designated 61 and 62. The faces of the magnet poles 63 and 64 are provided with non-clad teeth 65 extending parallel to the axis of rotation of the rotors 54 and 55 and cooperating with the copper clad teeth 56 thereof. The faces of the magnet poles 66 and 67 are provided with copper clad teeth 68 cooperating with the non-clad teeth 57 of the armatures.

In the embodiment of my invention illustrated in Fig. 13 a single rotary armature 69 is provided, the inner and outer peripheries of this armature being provided with sets of non-clad teeth 70 and 71 extending parallel to the axis of rotation of the armature.

The poles 72 and 73 of stationary electromagnet 74, the exciting coil of which is designated 75, are provided with teeth 76 and 77 which are copper clad similarly to the teeth 56 of Fig. 12 for example, cooperating with the teeth 70 and 71 of the armature.

In the embodiment of my invention illustrated in Figs. 14 and 15 I provide a rotary ring armature 78 having sets of teeth 79 on both its inner and outer periphery surrounded with copper 80 providing a low resistance circuit about each tooth. These teeth extend parallel to the axis of rotation of the armature.

The stator of this embodiment of the invention comprises magnet frame 81 and exciting coil 82. Carried in the magnet frame 81 and surrounding the armature 78 are a plurality of concentric rings 83 constituting one pole of the magnet. The inner peripheries of each of these rings is shaped to provide sets of teeth 84. These teeth are so disposed that the teeth provided by one ring 83 are offset with respect to the teeth provided by the adjacent ring 83 with reference to the transverse axis of the electromagnet, so that with respect to the axis of rotation of the armature 78 the sets of teeth 84 may be said to be arranged spirally about the inner peripheries of the rings 83.

The other pole of the electromagnet is provided by concentric rings 85 each of which is so shaped on its outer periphery as to provide sets of teeth 86 disposed similarly to the teeth 84, as will be seen from Fig. 15.

It is to be understood that the exciting current for the electromagnet in the various embodiments of my invention may be taken from any suitable source of power, as for instance when the brake is applied to a motor vehicle the exciting current can be taken from the vehicle battery as indicated in Figures 1 and 8 where B designates the battery, L the battery leads and S a suitable switch.

In the embodiment of the invention illustrated in Figs. 16 and 17 and in which figures 87 designates the rotor and 88 the stator of my improved brake, I make provision for cooling and sound deadening by equipping the stator with water jackets 89. The teeth 90 on the poles of the stator are extended along the side of the magnet frame and copper clad, as shown at 91.

The construction shown in Fig. 18 is also water cooled, the frame 92 of the stator being cored out as shown at 93 for the reception of the cooling fluid 94.

It is to be understood that in all the embodiments of my invention hereinabove described the stator and rotor may be reversed, the stator becoming a rotor and the rotor a stator; it is to be understood also that in all cases the number of teeth on one member is a multiple of the number of teeth on the other member; it is to be appreciated, furthermore, that in all cases where the teeth of major extent may be shown on the rotor, for example, they may, within the contemplation of this invention, be located on the stator; likewise where the teeth of major extent are disposed at an angle to the axis of rotation of the rotor, for instance, such teeth may be disposed parallel to the axis of rotation of the rotor and the teeth on the other member set at an angle.

Throughout the above description I have referred to the teeth on one element of the brake as being copper clad. It is to be distinctly understood that the teeth on either or both brake elements may be copper clad without departing from the spirit and scope of this invention.

Other and further variations may be made in the details of construction and arrangement of parts above described within the purview of my invention.

What I claim is:—

1. An electromagnetic brake comprising in combination a magnet with toothed poles, a toothed magnetic armature for said magnet, one of said members being rotatable relatively to the other, the teeth of one of said members being disposed at an angle to the teeth on the other of said members, and means for energizing said magnet.

2. An electromagnetic brake comprising in combination a magnet with toothed poles, a toothed magnetic armature for said magnet, one of said members being rotatable relatively to the other, the teeth on one of said members being angularly disposed with respect to the teeth on the other of said members, and a single winding for said magnet.

3. An electromagnetic brake comprising in combination a magnet with toothed poles, a toothed magnetic armature for said magnet, one of said members being rotatable relatively to the other, and the teeth on one of said members being disposed at an angle to the teeth on the other of said members, the number of teeth on one member being a multiple of the number of teeth on the other, and means for energizing said magnet.

4. An electromagnetic brake comprising in combination a magnet with toothed poles, a toothed magnetic armature for said magnet, one of said members being rotatable relatively to the other, and the teeth on one of said members being disposed at an angle to the teeth on the other of said members, the number of teeth on one member being a multiple of the number of teeth on the other, and a single winding for said magnet.

5. An electromagnetic brake comprising in combination a magnet with toothed poles, a toothed magnetic armature for said magnet, one of said members being rotatable relatively to the other, the teeth on one of said members being disposed at an angle to the teeth on the other of said members, a pole of one member having twice as many teeth as the cooperating pole of the other member.

6. An electromagnetic brake comprising in combination a single circular magnet having a plurality of poles the face of each of which is toothed, a toothed magnetic armature for said magnet, one of said members being rotatable relatively to the other, the teeth on one of said members being angularly disposed with respect to the teeth on the other of said members, the number of teeth on one of said members being a multiple of the number of teeth on the other of said members and said teeth being so arranged that the reluctance of the main magnetic circuit is substantially constant, and means for energizing said magnet.

7. An electromagnetic brake comprising in combination a single circular magnet having a plurality of poles the face of each of which is toothed, a toothed magnetic armature for said magnet, one of said members being rotatable relatively to the other, the teeth on one of said members being angularly disposed with respect to the teeth on the other of said members, the number of teeth on one of said members being a multiple of the number of teeth on the other of said members and said teeth being so arranged that the reluctance of the main magnetic circuit is substantially constant, and a single winding for said magnet.

8. An electromagnetic brake comprising in combination a magnet having toothed poles, a toothed magnetic armature for said magnet, the teeth on one of said members being angularly disposed with respect to the teeth on the other of said members, said armature being rotatable relatively to the said magnet, the number of teeth on a pole of one of said members being twice the number of teeth on the cooperating pole of the other of said members, and means for energizing said magnet.

9. An electromagnetic brake comprising in combination a single circular magnet provided with toothed poles, a toothed magnetic armature for said magnet, one of said members being rotatable relatively to the other, the teeth on one of said members being disposed at an angle to the teeth on the other of said members, and the number of teeth on one of said members being a multiple of the number of teeth on the other of said members, and a winding for said magnet surrounding said members.

10. An electromagnetic brake comprising in combination a magnet with toothed poles, a toothed magnetic armature for said magnet, one of said members being rotatable relatively to the other, the teeth on one of said members being angularly disposed with respect to the teeth on the other of said members, and a winding for said magnet surrounding said members.

11. An electromagnetic brake comprising in combination a magnet with toothed poles, a toothed magnetic armature for said magnet, the teeth on one of said members being disposed at an angle to the teeth on the other of said members, one of said members being rotatable relatively to the other, a pole of one member having twice as many teeth as the cooperating pole of the other member, and a winding for said magnet surrounding said members.

12. An electromagnetic brake comprising in combination a circular magnet having toothed poles, a toothed magnetic armature for said magnet, one of said members being rotatable relatively to the other, the teeth on one of said members extending parallel to the axis of rotation of the rotatable member, the teeth on the other of said members extending at an angle to said axis of rotation.

13. An electromagnetic brake comprising in combination a circular magnet having toothed poles, a toothed magnetic armature for said magnet, one of said members being rotatable relatively to the other, the teeth on one of said members extending parallel to the axis of rotation of the rotatable member, the teeth on the other of said members extending at an angle to said axis of rotation, the number of teeth on one of said members being a multiple of the number of teeth on the other of said members, and means for energizing said magnet.

14. An electromagnetic brake comprising in combination a circular magnet having toothed poles, a toothed magnetic armature for said magnet, one of said members being rotatable relatively to the other, the teeth on one of said members extending parallel to the axis of rotation of the rotatable member, the teeth on the other of said members extending at an angle to said axis of rotation, the number of teeth on one of said members being a multiple of the number of teeth on the other of said members, and a single winding for said magnet.

15. An electromagnetic brake comprising in combination a circular magnet with toothed poles, a circular toothed magnetic armature for said magnet, one of said members being rotatable relatively to the other, the teeth on one of said members being disposed parallel to the axis of rotation of the rotatable member, the teeth on the other of said members being disposed at an angle to said axis of rotation, and a single winding for said magnet surrounding said toothed members.

16. An electromagnetic brake comprising in combination a circular magnet with toothed poles, a circular winding for said magnet surrounding said toothed poles, a rotatable toothed armature for said magnet provided with peripheral teeth, the teeth on the armature extending at an angle to the teeth on the poles of the magnet.

17. An electromagnetic brake comprising in combination a circular magnet the poles of which are on the inner periphery of the magnet and provided with teeth, a winding for said magnet surrounding said toothed poles, a rotary armature for said magnet surrounded by said toothed magnet poles, the outer periphery of said armature being toothed, the teeth on the magnet poles being disposed at an angle to the teeth on the face of the armature.

18. An electromagnetic brake comprising in combination a circular magnet, the inner periphery of which provides the poles of the magnet, teeth on the magnet poles extending transversely of the magnet, an exciting coil for the magnet surrounding said toothed poles, a rotary armature for said magnet surrounded by the magnet, the outer periphery of the armature being provided with teeth cooperating with the teeth on the magnet poles, the armature teeth being disposed at an angle to the axis of rotation of the armature.

19. An electromagnetic brake comprising in combination a fixed circular magnet, the inner periphery of which provides the magnet poles, copper clad teeth on the faces of said poles, said teeth extending transversely of the magnet, an energizing coil for the magnet mounted within the magnet frame and surrounding said toothed poles, a rotary ring armature for said magnet, the outer periphery of which is provided with sets of teeth cooperating respectively with the teeth of the magnet poles, the teeth on said armature being disposed parallel to each other but at an angle to the teeth on the magnet poles.

20. An electromagnetic brake comprising in combination a stationary circular magnet the inner periphery of which provides the magnet poles, copper clad teeth on the faces of said magnet poles extending transversely of the magnet, the toothed faces of said poles being grooved circumferentially of the magnet, said grooves being filled with electric conducting material, a rotary armature for said magnet, the outer periphery of which is provided with teeth cooperating with the teeth on the poles of the magnet, the teeth on the armature extending at an angle to the axis of rotation of the armature.

21. An electromagnetic brake comprising in combination a circular magnet provided with toothed poles, a toothed ring armature for said magnet, one of said members being rotatable relatively to the other, said armature teeth being offset with respect to each other transversely of the face of the armature.

22. An electromagnetic brake comprising in combination a circular magnet with toothed poles, a toothed ring armature for said magnet, one of said members being rotatable relatively to the other, the teeth on the armature being arranged spirally circumferentially of the armature, a coil surrounding the toothed poles of the magnet and said armature and means for energizing said coil.

23. An electromagnetic brake comprising in combination a circular magnet with toothed poles, a toothed ring armature for said magnet, a coil surrounding the poles of the magnet and said armature, means for energizing said coil, the inner periphery of said magnet being toothed and providing the magnet poles, the outer periphery of said armature being provided with teeth arranged spirally circumferentially of the armature and offset with respect to each other transversely of the face of the armature.

24. An electromagnetic brake comprising in combination a circular magnet the inner periphery of which provides the magnet poles, said poles being toothed, a ring armature for said magnet, the outer periphery of which is toothed, one of said members being rotatable relatively to the other, the teeth on one of said members being disposed parallel to the axis of rotation of the rotatable member, the teeth on the other of said members being arranged spirally circumferentially thereof and offset with respect to each other transversely thereof, and a winding for said magnet surrounding the toothed magnet poles and the armature.

25. An electromagnetic brake comprising in combination a circular magnet with toothed poles, a ring armature therefor, said armature being rotatable with respect to said magnet and provided with teeth substantially triangular in cross section, said teeth being arranged spirally circumferentially of the armature and offset with respect to each other transversely of the armature, and energizing means for the magnet.

26. An electromagnetic brake comprising in combination a circular magnet with toothed poles, a ring armature therefor, said armature being provided with teeth substantially diamond shaped in cross section, said teeth being arranged spirally circumferentially of the armature and offset with respect to each other transversely of the armature, and energizing means for the magnet.

27. An electromagnetic brake comprising in combination a circular magnet with toothed poles, a ring armature therefor, said armature being provided with teeth irregularly shaped in cross section, said teeth being arranged spirally circumferentially of the armature and offset with respect to each other transversely of the armature, and energizing means for the magnet.

28. An electromagnetic brake comprising in combination a circular electromagnet provided with toothed poles, a circular armature therefor extending between said toothed poles and toothed on each face, the teeth on the armature faces being disposed at an angle to the teeth on the poles of the magnet, and means for energizing the magnet.

29. An electromagnetic brake comprising in combination a plurality of circular concentric electromagnets provided with toothed poles, rotary circular armatures therefor lying between the poles of said magnets, and teeth on each face of each of said magnets disposed at an angle to the teeth on the poles of the magnets.

30. An electromagnetic brake including in combination an electromagnetic member having toothed poles, a magnetic armature member also having toothed poles cooperating with the toothed poles of the said electromagnetic member, one of the said members being rotatable relative to the other, the teeth on one of said members being of major facial extent as compared to the teeth of the other of said members, which are of minor facial extent, one set of teeth extending parallel to the axis of rotation of the rotatable member, the other set of teeth extending at an angle thereto, the said teeth being proportioned relative to each other to provide a magnetic path of substantially uniform reluctance between the two said members at substantially all positions of relative movement therebetween.

31. An electromagnetic brake including in combination an electromagnetic member having polar projections or teeth, an armature member also having polar projections or teeth cooperating with the polar projections of the said electromagnetic member for conducting the magnetic flux generated by the latter, one of the said members being rotatable relative to the other, the polar projections of one of said members being parallel to the axis of rotation of the rotatable member, the other polar projections being at an angle thereto, the polar projections of one of said members being of major width circumferentially as compared to the polar projections of the other of the said members, which are of minor width circumferentially, the said major width polar projections each having a width circumferentially substantially equal to the circumferential width of one of said minor width polar projections plus the circumferential width of the space therebetween.

32. An electromagnetic brake including in combination an electromagnetic member having polar projections or teeth, an armature member also having polar projections or teeth cooperating with the polar projections of the said electromagnetic member for conducting the magnetic flux generated by the latter, one of the said members being rotatable relative to the other, the polar projections of one of said members being parallel to the axis of rotation of the rotatable member, the other polar projections being disposed at an angle thereto, the polar projections of one of said members being of major width circumferentially as compared to the polar projections of the other of the said members, which are of minor width circumferentially, electroconductive means around the said minor width polar projections, the said major width polar projections each having a width circumferentially substantially equal to the circumferential width of one of said minor width polar projections plus the circumferential width of the space therebetween.

33. An electromagnetic brake including in combination an electromagnetic member having polar projections or teeth, a magnetic armature member also having polar projections or teeth cooperating with the polar projections of the said electromagnetic member for conducting the magnetic flux generated by the latter, one of the said members being rotatable relative to the other, the polar projections of one of said members extending diagonally with respect to the polar projections of the other member, the polar projections of one of said members being of major facial extent as compared to the polar projections of the other of said members, which are of minor facial extent, the said major extent and minor extent polar projections being proportioned relative to each other to provide a magnetic path of substantially uniform reluctance between the two said members at substantially all positions of relative movement therebetween, and short circuiting electroconductive means extending around the said minor extent polar projections to create therein secondary magnetic forces of such polarity as to oppose the relative movement referred to.

34. An electromagnetic brake including in combination an electromagnetic member having polar projections or teeth, a magnetic armature member also having polar projections or teeth cooperating with the polar projections of the said electromagnetic member, one of the said members being rotatable relative to the other, and the polar projections of one member extending diagonally with respect to the polar projections of the other member, the polar projections of one of said members being of major facial extent as compared to the polar projections of the other of said members, which are of minor facial extent, the said major extent poles being so proportioned that a given one thereof provides a magnetic bridge between two of the said minor extent poles of such span as to contract the flux path between itself and one of said minor extent poles at the same time and to substantially the same degree that it expands the flux path between itself and the other of said minor extent poles.

35. An electromagnetic brake including in combination an electromagnetic member having polar projections or teeth, a magnetic armature member also having polar projections or teeth cooperating with the polar projections of the said electromagnetic member, one of the said members being rotatable relative to the other, and the polar projections of one member extending diagonally with respect to the polar projections of the other member, the polar projections of one of said members being of major facial extent as compared to the polar projections of the other of said members, which are of minor facial extent, the said major extent poles being so proportioned that a given one thereof provides a magnetic bridge between two of the immediately adjacent minor extent poles of such span as to contract the flux path between itself and one of said minor extent poles at the same time that it expands the flux path between itself and the other of the said immediately adjacent minor extent poles.

36. An electromagnetic brake including in combination an electromagnetic member having polar projections or teeth, a magnetic armature member also having polar projections cooperating with the polar projections of the said electromagnetic member, one of the said members being rotatable relative to the other, the polar projections of one of said members being of major facial extent as compared to the polar projections of the other of said members and disposed diagonally with respect thereto, the said major extent poles being so proportioned that a given one thereof provides a magnetic bridge between two of the immediately adjacent minor extent poles of such span as to contract the flux path between itself and one of said minor extent poles at the same time and to substantially the same degree that it expands the flux path between itself and the other of said immediately adjacent minor extent poles.

37. An electromagnetic brake including in combination an electromagnetic member having polar projections or teeth, an armature member also having polar projections or teeth cooperating with the polar projections of the said electromagnetic member, one of the said members being rotatable relative to the other, the polar projections of one of said members being of major pitch width as compared to the polar projections of the other of the said members, and extending diagonally with respect thereto, the said major width polar projections being so proportioned that a given one thereof provides a magnetic bridge between two of the said minor width poles of such extent as to contract the flux path between itself and one of said minor width poles at the same time and to substantially the same degree that it expands the flux path between itself and the other of said minor width poles.

38. An electromagnetic brake including in combination an electromagnetic member for generating a main magnetic flux and having polar projections or teeth, a magnetic armature member also having polar projections or teeth cooperating with the polar projections of the said electromagnetic member, one of said members being rotatable relative to the other, the polar projections of one of said members being of major facial extent as compared to the polar projections of the other of said members, and extending in a direction parallel to the axis of rotation of the rotatable member, electroconductive means extending around said minor extent polar projections, the said major extent polar projections being so proportioned that a given one thereof provides a magnetic bridge between two of the said minor extent polar projections of such span as to contract the flux path between itself and one of said minor extent polar projections at the same time and to substantially the same degree that it expands the flux path between itself and the other of said minor extent polar projections, whereby upon relative movement between said members the electroconductive means around said minor extent polar projections will induce in the latter secondary magnetic forces of such polarity as will reinforce the main magnetic flux in the said minor extent polar projections with respect to which the flux path is being contracted and oppose the said main magnetic flux at the minor extent polar projection with respect to which the flux path is being expanded.

39. An electromagnetic brake including in combination an electromagnetic member for generating a main magnetic flux and having polar projections or teeth, a magnetic armature member also having polar projections or teeth cooperating with the polar projections of the said electromagnetic member, one of said members being rotatable relative to the other, the polar projections of one of said members being of major pitch width as compared to the polar projections of the other of said members, which are of minor pitch width, the major pitch width projections extending at an angle with respect to the axis of rotation of the rotatable member, the minor pitch width projections extending parallel to the same axis, short-circuiting electroconductive means extending around the said minor width polar projections, the said major width polar projections being so proportioned that a given one thereof provides a magnetic bridge between two of the said minor width polar projections of such extent as to contract the flux path between itself and one of said minor width polar projections at the same time and to substantially the same degree that it expands the flux path between itself and the other of said minor width polar projections, whereby upon relative movement between said members the electroconductive means around said minor width polar projections will induce in the latter secondary magnetic forces of such polarity as will reinforce the main magnetic flux in the minor width polar projection with respect to which the flux path is being contracted and oppose the said main magnetic flux at the minor width polar projection with respect to which the flux path is being expanded.

ETHELBERT M. FRASER.